US010094693B2

(12) United States Patent
Peters

(10) Patent No.: US 10,094,693 B2
(45) Date of Patent: Oct. 9, 2018

(54) FLOW METER

(71) Applicant: Marcel Leonardus Josephus Petrus Peters, Elst (NL)

(72) Inventor: Marcel Leonardus Josephus Petrus Peters, Elst (NL)

( * ) Notice: Subject to any disclaimer, the term of this patent is extended or adjusted under 35 U.S.C. 154(b) by 196 days.

(21) Appl. No.: 15/032,169

(22) PCT Filed: Oct. 29, 2014

(86) PCT No.: PCT/NL2014/050753
§ 371 (c)(1),
(2) Date: Apr. 26, 2016

(87) PCT Pub. No.: WO2015/065187
PCT Pub. Date: May 7, 2015

(65) Prior Publication Data
US 2016/0258800 A1  Sep. 8, 2016

(30) Foreign Application Priority Data

Oct. 29, 2013 (NL) ..................................... 2011701

(51) Int. Cl.
*G01F 15/14* (2006.01)
*G01F 1/05* (2006.01)
(52) U.S. Cl.
CPC ............... *G01F 15/14* (2013.01); *G01F 1/056* (2013.01)
(58) Field of Classification Search
CPC .................................. G01F 1/056; G01F 15/14
See application file for complete search history.

(56) References Cited

U.S. PATENT DOCUMENTS

| 3,861,210 A | 1/1975 | Griverus |
| 4,782,707 A | 11/1988 | Yamazaki et al. |
| 4,819,577 A * | 4/1989 | Campau ................. G01F 1/056 |
| | | 116/264 |

FOREIGN PATENT DOCUMENTS

| DE | 29 10 387 A1 | 9/1980 |
| DE | 37 37 427 A1 | 6/1988 |
| EP | 0 172 451 A2 | 2/1986 |
| JP | S62 168022 A | 7/1987 |
| WO | 2008/044917 A1 | 4/2008 |

OTHER PUBLICATIONS

International Search Report, dated Mar. 19, 2015, from corresponding PCT application.

* cited by examiner

*Primary Examiner* — Justin Olamit
(74) *Attorney, Agent, or Firm* — Young & Thompson

(57) ABSTRACT

A flow meter includes a housing which accommodates helical guide blades and a core located within the guide blades, and a measuring chamber in which a measuring ball can rotate in a circle. Between the end of the core bounding on the measuring chamber and the end face of the outlet section oriented to the measuring chamber there are no wall portions present, and the distance between the outside edge of the core end bounding on the measuring chamber and the inside edge of outlet-section-end-face oriented to the measuring chamber is smaller than the diameter of the measuring ball. Consequently, the fluid may unimpedely flow out of the measuring chamber as a result of which there is low flow resistance of the flow meter. Moreover, this causes no obstacles to be present between two oppositely arranged spots on the housing that may disturb a light ray for the measurement.

4 Claims, 2 Drawing Sheets

FLOW METER

FIELD OF THE INVENTION

The invention relates to a flow meter comprising:
- a housing comprised of an inlet section and an outlet section, as well as a widened section located in between and comprised of a guide portion connecting to the inlet section and a measuring portion connecting to the guide portion and the outlet section;
- helical guide blades located in the guide portion and connected to the housing;
- a core present within the guide blades;
- a measuring chamber located within the measuring portion, which chamber is bounded on an outside by the measuring portion of the housing, is bounded on the inlet side by the guide blades, is bounded on a running side located opposite to the inlet side by an outlet-section-end-face oriented to the measuring chamber, and is bounded on an inside by an end of the core;
- a measuring ball present in the measuring chamber; and
- an opening present between the core-end bounding on the measuring chamber and the outlet section end face oriented to the measuring chamber.

During operation the flow meter is installed between two pipe elements and liquid or gas flows via the inlet into the section containing the helical blades, where the liquid is put in rotation and from there into the measuring chamber where a measuring ball is put in rotation and then discharged through the outlet. The rotational speed of the measuring ball is a measure for the flow rate of the fluid.

The rotational speed of the measuring ball is preferably measured by means of a light ray which is caused to pass through the transparent housing and detected at an opposite spot. The number of detected interruptions of the light ray (by the ball) forms a measure for the flow rate.

STATE OF THE ART

A flow meter of this type is known from WO 2008/044917 A. A disadvantage of this known flow meter is that an interior wall provided with openings is located between the core end bounding on the measuring chamber and the outlet-section-end-face oriented to the measuring chamber. This interior wall provides that the measuring ball remains in the measuring chamber and cannot leave the flow meter through the outlet section. For measuring the frequency of the interruptions of the light ray shining through the transparent measuring portion of the housing, the light ray is to be directed through the openings in the interior wall so as to avoid that the interior wall (either transparent or not) disturbs or blocks the light ray. This alignment is to be executed in an accurate manner in view of the small available space and cannot be executed or can be executed with great difficulty as a result of the rotational symmetry of the housing.

SUMMARY OF THE INVENTION

It is an object of the invention to provide a flow meter of the type defined in the opening paragraph where the problem mentioned above does not present itself or at any rate to a lesser extent. For this purpose the flow meter according to the invention is characterized in that between the core end bounding on the measuring chamber and the outlet-section-end-face oriented to the measuring chamber no wall portions are located, and the distance between the outside edge of the core end bounding on the measuring chamber and the inside edge of the outlet-section-end-face oriented to the measuring chamber is smaller than the diameter of the ball. In the flow meter according to the invention there are no interior wall portions present within the housing at the location of the measuring chamber that are capable of disturbing a light ray. As a result, the light ray can enter at any desired spot along the periphery and thus does not need tuning.

In addition, a large unimpeded outlet opening is present as a result, so that the flow resistance is lower than when the known flow meter is applied.

An embodiment of the flow meter according to the invention is characterized in that the guide blades are each provided with an inlet end bounding on the inlet section and an outlet end bounding on the measuring chamber, which outlet end is provided with a recess that has an arched bounding wall, where the maximum distance between the outlet-section-end-face oriented to the measuring chamber and this arched bounding wall is larger than the diameter of the measuring ball and the minimum distance between the outlet-section-end-face oriented to the measuring chamber and this arched bounding wall is smaller than the diameter of the measuring ball. As a result, the fluid coming from the guide blades flows even more directly into the rotation path of the measuring ball than in the known flow meter where there is a larger distance between the ball path and the guide blades. In consequence, the measuring accuracy and reproducibility is greater than for the known flow meter.

A further embodiment of the flow meter according to the invention is characterized in that the flow meter comprises two parts in addition to the measuring ball, that is to say, a first part comprising the inlet section, the guide portion, the guide blades and the measuring portion, and a second part comprising the outlet section, where the outside edges of the guide blades are attached to the housing and the inside edges of the guide blades are attached to the core, and where the inside diameter of the guide blades is equal to the outside diameter of the core. The result of this is that the flow meter can be assembled in a simple manner and there are no parts of the guide blades that are located at a smaller radius than that of the outside of the core, so that when injection molding is being executed the lower die half (in the state of the flow meter shown in FIG. 1) of the first part of the flow meter comes loose as a result of distortion.

BRIEF DESCRIPTION OF THE DRAWING FIGURES

The invention will be further described below in more detail with reference to an example of embodiment of the flow meter according to the invention represented in the drawing figures, in which.

DETAILED DESCRIPTION OF THE DRAWING FIGURES

Figure 1:
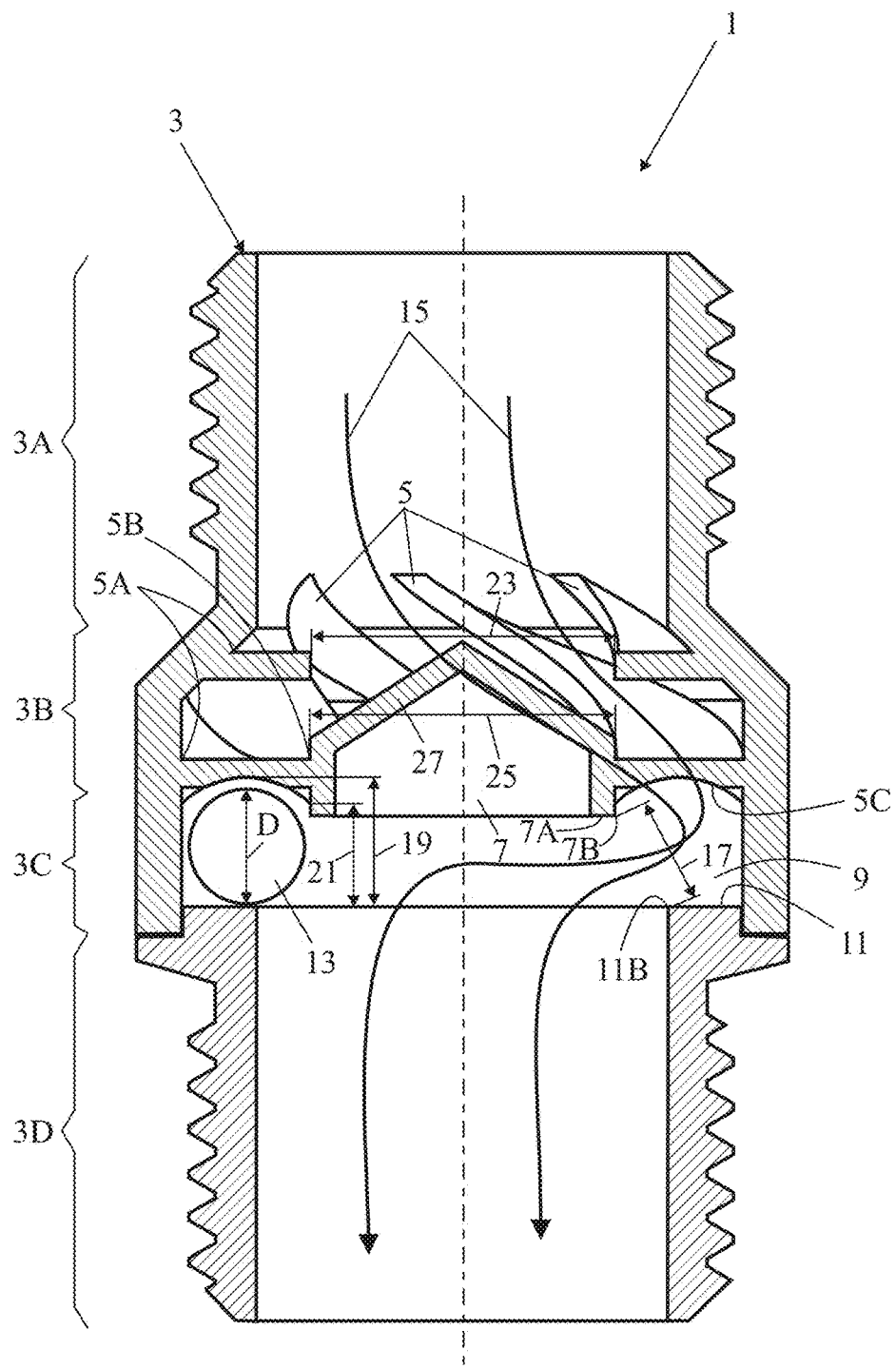
FIG. 1 shows a sectional view of an embodiment of the flow meter according to the invention.
Figure 2:
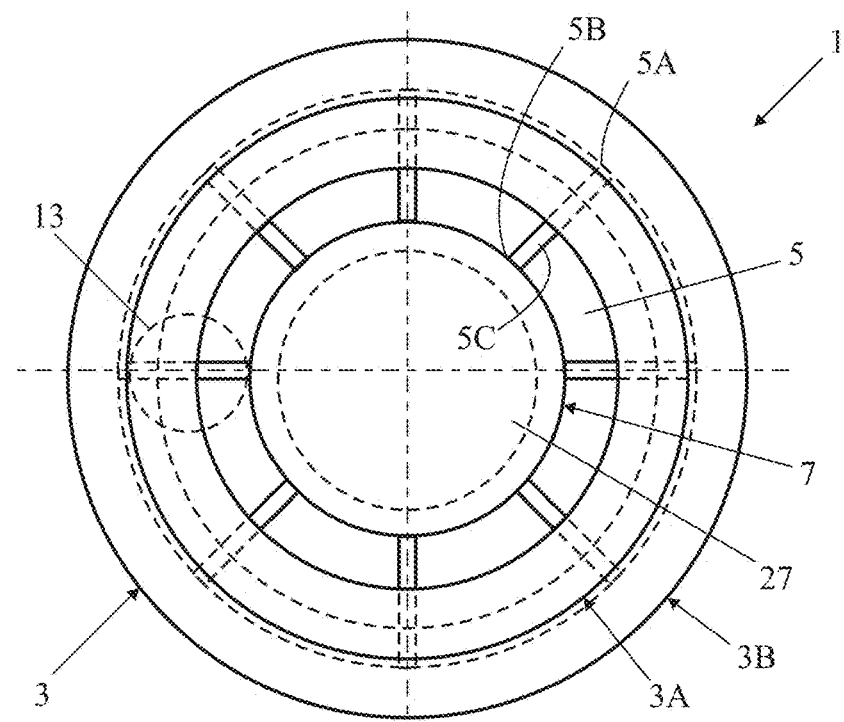
FIG. 2 shows a top plan view of the flow meter shown in FIG. 1.
Figure 3:
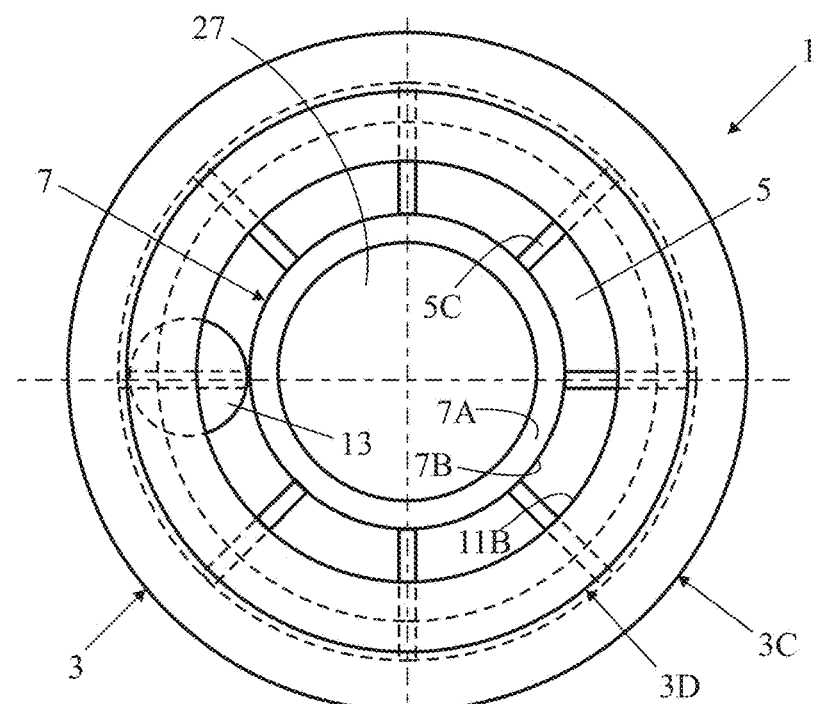
FIG. 3 shows a bottom view of the flow meter shown in FIG. 1.

FIGS. 1 to 3 show an embodiment of the flow meter according to the invention in a sectional view, top plan view and bottom view respectively. The flow meter 1 comprises a housing 3 provided with an inlet section 3A and an outlet section 3B, as well as a widened section located in between.

This widened section comprises a guide portion 3B connecting to the inlet section, and a measuring portion 3C connecting to the guide portion and the outlet section. The guide portion accommodates eight helical guide blades 5 whose outside egdes 5A are attached to the housing. Within these guide blades is present a core 7 which is attached to the inside edges 5B of the lower parts of the guide blades.

Within the measuring portion is accommodated a measuring chamber 9 of which an outside is bounded by the measuring portion 3C of the housing and is bounded on an inlet side by the under sides 5C of the guide blades. On a running side situated opposite to the inlet side the measuring chamber is bounded by a measuring-chamber-oriented end face 11 of the outlet section, and on an inside the measuring chamber is bounded by an end 7A of the core. Between this end 7A bounding on the measuring chamber and the measuring-chamber-oriented end face 11 of the outlet section there is an opening forming the outlet opening of the fluid from the measuring chamber. A measuring ball 13 is located in the measuring chamber.

During operation fluid flows through the inlet bounded by the inlet section 3A into the blade portion bounded by the guide portion 3B, in which blade portion the fluid is put in rotation by the helical blades 5. When leaving the blade portion the fluid directly flows into the measuring chamber 9 bounded by the measuring portion 3C in which measuring chamber the measuring ball 13 is put in rotation. Subsequently, the fluid flows outwards through the outlet bounded by the outlet section 3D. The rotational speed of the measuring ball is a measure for the flow rate of the fluid. In FIG. 1 the flow of the fluid is indicated by means of arrows 15.

Between the core end 7A bounding on the measuring chamber and the end face 11 of the outlet section oriented to the measuring chamber there are no wall portions. As a result, the fluid can unimpededly flow from the measuring chamber to the outlet due to which the flow resistance of the flow meter is low. Moreover, no obstacles are found in consequence between two oppositely arranged spots on the housing which obstacles could disturb the light ray for the measurement.

For preventing the measuring ball 13 from leaving the measuring chamber 9, the distance 17 between the outside edge 7B of the core end bounding on the measuring chamber and the inside edge 11B of the end face of the outlet section oriented to the measuring chamber is smaller than the diameter of the measuring ball 13.

The guide blades 5 are provided with an inlet end bounding on the inlet and an outlet end bounding on the measuring chamber. This outlet end is provided with a recess that has an arched bounding wall 5C. The maximum distance 19 between the outlet-section-end-face 11 oriented to the measuring chamber and this arched bounding wall 5C is larger than the diameter D of the measuring ball 13 and the minimum distance 21 between the outlet-section-end-face 11 oriented to the measuring chamber and this arched bounding wall 5C is smaller than the diameter D of the measuring ball 13. In consequence, the fluid coming from the guide blades directly flows into the rotation path of the measuring ball.

Aside from the measuring ball 13 the flow meter 1 is comprised of two parts, that is to say a first part comprised of the inlet section 3A, the guide portion 3B, the guide blades 5 and the core 7, and a second part comprised of the outlet section 3D. The inside diameter 23 of the guide blades is equal to the outside diameter 25 of the core, so that when injection molding is being executed the bottom die half (in the state of the flow meter shown in FIG. 1) for the first part of the flow meter comes loose as a result of distortion.

The inlet section 3A and the outlet section 3D both have an equally wide cylindrical opening and are in line. The widened section (formed by the portions 3B and 3C) has a larger diameter than that of the inlet and outlet sections, where the transition from the inlet section to the widened section is not effected abruptly in one step, but gradually by means of a conical wall portion which includes the core 7 that has a conical wall 27 oriented to the inlet, which wall gradually guides the axially directed incoming fluid stream to the guide blades 5.

Albeit the invention has been elucidated in the foregoing with reference to the drawing figures, it should be set out that the invention is not by any manner or means restricted to the embodiment shown in the drawing figures. The invention also extends to any embodiments deviating from the embodiment shown in the drawing figures within the scope defined by the claims.

The invention claimed is:

1. Flow meter (1) comprising:
   a housing (3) comprised of an inlet section (3A) and an outlet section (3D), as well as a widened section located in between and comprised of a guide portion (3B) connecting to the inlet section and a measuring portion (3C) connecting to the guide portion and the outlet section;
   helical guide blades (5) located in the guide portion and connected to the housing;
   a core (7) present within the guide blades;
   a measuring chamber (9) located within the measuring portion, which chamber is bounded on an outside by the measuring portion (3C) of the housing, is bounded on an inlet side by the guide blades (5), is bounded on a running side located opposite to the inlet side by an end face (11) of the outlet section oriented to the measuring chamber, and is bounded on an inside by an end (7A) of the core;
   a measuring ball (13) present in the measuring chamber; and
   an opening present between said end (7A) of the core bounding on the measuring chamber and said end face (11) of the outlet section oriented to the measuring chamber,
   wherein between said end (7A) of the core (7) bounding on the measuring chamber and said end face (11) of the outlet section (3D) oriented to the measuring chamber no wall portions are present, and a distance (17) between an outside edge (7B) of the core end (7A) bounding on the measuring chamber and an inside edge (11B) of the end face (11) of the outlet section oriented to the measuring chamber is smaller than a diameter (D) of the measuring ball (13); and
   wherein the guide blades (5) are each provided with an inlet end bounding on the inlet section (3A) and an outlet end bounding on the measuring chamber (9), which outlet end is provided with a recess that has an arched bounding wall (5C), where a maximum distance (19) between the end face (11) of the outlet section (3D) oriented to the measuring chamber and said arched bounding wall (5C) is larger than said diameter (D) of the measuring ball (13), and a minimum distance (21) between the end face (11) of the outlet section (3D) oriented to the measuring chamber and said arched bounding wall (5C) is smaller than said diameter (D) of the measuring ball (13).

2. Flow meter (1) as claimed in claim 1, wherein aside from the measuring ball (13) the flow meter (1) is comprised of a first part comprised of the inlet section (3A), the guide portion (3B), the guide blades (5) and the measuring portion (3C) and the core (7), and a second part comprised of the outlet section (3D), where outside edges (5A) of the guide blades (5) are attached to the housing (3) and inside edges (5B) of the guide blades are attached to the core (7), and where an inside diameter (23) of the guide blades is equal to an outside diameter (25) of the core.

3. Flow meter (1) comprising:
a housing (3) comprised of an inlet section (3A) and an outlet section (3D), as well as a widened section located in between and comprised of a guide portion (3B) connecting to the inlet section and a measuring portion (3C) connecting to the guide portion and the outlet section;
helical guide blades (5) located in the guide portion and connected to the housing;
a core (7) present within the guide blades;
a measuring chamber (9) located within the measuring portion, which chamber is bounded on an outside by the measuring portion (3C) of the housing, is bounded on an inlet side by the guide blades (5), is bounded on a running side located opposite to the inlet side by an end face (11) of the outlet section oriented to the measuring chamber, and is bounded on an inside by an end (7A) of the core;
a measuring ball (13) present in the measuring chamber; and
an opening present between said end (7A) of the core bounding on the measuring chamber and said end face (11) of the outlet section oriented to the measuring chamber,
wherein the guide blades (5) are each provided with an inlet end bounding on the inlet section (3A) and an outlet end bounding on the measuring chamber (9), which outlet end is provided with a recess that has an arched bounding wall (5C), where a maximum distance (19) between the end face (11) of the outlet section (3D) oriented to the measuring chamber and said arched bounding wall (5C) is larger than a diameter (D) of the measuring ball (13), and a minimum distance (21) between the end face (11) of the outlet section (3D) oriented to the measuring chamber and said arched bounding wall (5C) is smaller than said diameter (D) of the measuring ball (13).

4. Flow meter (1) as claimed in claim 3, wherein aside from the measuring ball (13) the flow meter (1) is comprised of a first part comprised of the inlet section (3A), the guide portion (3B), the guide blades (5) and the measuring portion (3C) and the core (7), and a second part comprised of the outlet section (3D), where outside edges (5A) of the guide blades (5) are attached to the housing (3) and inside edges (5B) of the guide blades are attached to the core (7), and where an inside diameter (23) of the guide blades is equal to an outside diameter (25) of the core.

* * * * *